United States Patent
Zemmouri

(12) 
(10) Patent No.: US 11,452,965 B2
(45) Date of Patent: *Sep. 27, 2022

(54) DEVICE FOR PRODUCING AND TREATING A GAS STREAM THROUGH A VOLUME OF LIQUID, AND FACILITY AND METHOD IMPLEMENTING SAID DEVICE

(71) Applicant: STARKLAB, Nomain (FR)

(72) Inventor: Jaouad Zemmouri, Nomain (FR)

(73) Assignee: STARKLAB, Nomain (FR)

( * ) Notice: Subject to any disclaimer, the term of this patent is extended or adjusted under 35 U.S.C. 154(b) by 5 days.

This patent is subject to a terminal disclaimer.

(21) Appl. No.: 17/181,028

(22) Filed: Feb. 22, 2021

(65) Prior Publication Data

US 2021/0197113 A1    Jul. 1, 2021

Related U.S. Application Data

(63) Continuation of application No. 15/524,862, filed as application No. PCT/FR2015/053001 on Nov. 6, 2015, now Pat. No. 10,946,326.

(30) Foreign Application Priority Data

Nov. 6, 2014  (FR) ........................................ 1460748
Nov. 6, 2014  (FR) ........................................ 1460750

(51) Int. Cl.
*B01D 47/02*    (2006.01)
*F24F 3/14*     (2006.01)
(Continued)

(52) U.S. Cl.
CPC ......... *B01D 47/021* (2013.01); *B01D 47/024* (2013.01); *B01D 53/18* (2013.01);
(Continued)

(58) Field of Classification Search
None
See application file for complete search history.

(56) References Cited

U.S. PATENT DOCUMENTS

| | | | |
|---|---|---|---|
| 2,138,153 A | 11/1938 | Grisdale | .............. B01D 47/021 |
| | | | 422/217 |
| 2,209,775 A | 7/1940 | Karlsteen | .................. F24F 3/16 |
| | | | 422/4 |

(Continued)

FOREIGN PATENT DOCUMENTS

| | | | |
|---|---|---|---|
| CH | 375472 A | 2/1964 | ............... C01B 3/32 |
| CH | 375472 A | 4/1964 | |

(Continued)

OTHER PUBLICATIONS

FR2723433 English Machine Translation (Year: 1996).
(Continued)

*Primary Examiner* — Jenna M Hopkins
(74) *Attorney, Agent, or Firm* — Blue Filament Law PLLC

(57) ABSTRACT

A device for producing and treating a gas stream is provided that includes an enclosure, of which the lower part is submerged in a liquid supply open at the top and includes at least one liquid intake opening. The submerged lower part of the enclosure contains a volume of this liquid and at least one opening for discharging a gas stream, positioned above the surface of the volume of liquid contained in the enclosure. The device further provides for injecting a gas stream including at least one injection conduit and extends in the upper part inside the enclosure outside the volume of liquid. During operation of the device an incoming gas stream is introduced to create an outgoing gas stream, treated by direct contact with said volume of liquid that is discharged outside
(Continued)

the enclosure. A facility inclusive of the device and method of operation are also provided.

20 Claims, 10 Drawing Sheets

(51) Int. Cl.
  *B01D 53/26* (2006.01)
  *B01D 53/18* (2006.01)
  *F24H 1/10* (2022.01)
  *F28C 3/06* (2006.01)
  *F24F 8/10* (2021.01)
  *F28C 3/08* (2006.01)
  *F24F 8/117* (2021.01)

(52) U.S. Cl.
  CPC ............. *B01D 53/263* (2013.01); *F24F 3/14* (2013.01); *F24F 8/10* (2021.01); *F24H 1/107* (2013.01); *F28C 3/06* (2013.01); *B01D 2258/0283* (2013.01); *F24F 8/117* (2021.01); *F28C 3/08* (2013.01); *Y02A 50/20* (2018.01)

(56) References Cited

U.S. PATENT DOCUMENTS

| | | | |
|---|---|---|---|
| 2,303,757 A | 12/1942 | Pierson | |
| 2,405,494 A | 8/1946 | Dupuy | F24F 6/12 96/340 |
| 2,551,890 A | 5/1951 | Love | |
| 2,703,228 A | 3/1955 | Fleisher | B01D 47/18 96/235 |
| 2,896,927 A | 7/1959 | Nagle et al. | |
| 3,504,481 A | 4/1970 | Zakarian | B01D 53/34 96/53 |
| 3,716,045 A | 2/1973 | Vollhardt | F28C 3/06 126/350.1 |
| 4,274,845 A | 6/1981 | Howard | B01D 45/10 126/299 E |
| 4,432,777 A | 2/1984 | Postma | B01D 47/021 261/122.1 |
| 4,697,735 A | 10/1987 | Temple | |
| 4,784,216 A | 11/1988 | Bracegirdle | F26B 23/10 165/110 |
| 5,078,759 A | 1/1992 | Kira | B01D 47/021 261/121.1 |
| 5,080,793 A | 1/1992 | Urlings | B01D 53/84 210/603 |
| 5,215,560 A | 6/1993 | Lee | A47L 9/181 96/330 |
| 5,308,385 A | 5/1994 | Winn | B01D 47/06 261/DIG. 76 |
| 5,796,798 A | 8/1998 | Aujollet | G21C 9/004 376/283 |
| 5,873,930 A | 2/1999 | Sanchez | A47L 9/181 55/445 |
| 5,908,491 A | 6/1999 | Hobbs | F24F 3/16 95/202 |
| 6,322,763 B1 | 11/2001 | McDaniel | |
| 6,391,093 B1 | 5/2002 | French | B23K 26/1435 95/214 |
| 6,467,758 B1 | 10/2002 | Filippi | B01D 3/16 261/128 |
| 6,572,689 B2 | 6/2003 | Cosby, II | F25B 15/02 62/495 |
| 6,616,733 B1 | 9/2003 | Pellegrin | B01D 47/04 95/150 |
| 6,626,983 B1 | 9/2003 | Cairns | F01N 3/04 95/226 |
| 6,761,756 B1 | 7/2004 | Gomez | F24F 3/16 96/329 |
| 7,549,418 B1 | 6/2009 | Moorman | F24D 11/003 126/623 |
| 7,988,909 B1 | 8/2011 | Ruan | A61L 9/145 422/4 |
| 8,066,947 B2 | 11/2011 | Niazi | A61L 9/145 422/122 |
| 8,313,564 B2 | 11/2012 | Kwack | B01D 47/021 95/223 |
| 8,758,680 B2 | 6/2014 | Hishida | B01D 47/024 422/5 |
| 8,764,885 B2 | 7/2014 | Baxter | B01D 7/02 95/226 |
| 10,456,736 B2 | 10/2019 | Zhu | B01D 53/1406 |
| 2005/0109209 A1 | 5/2005 | Lee | B01D 45/12 95/149 |
| 2005/0145108 A1 | 7/2005 | Rubin | B01D 53/78 95/226 |
| 2005/0274257 A1 | 12/2005 | Reznik | B01D 53/14 95/226 |
| 2008/0017032 A1 | 1/2008 | Pellegrin | B01D 47/04 95/150 |
| 2008/0271603 A1 | 11/2008 | Triplett | A61L 9/014 95/150 |
| 2010/0126702 A1 | 5/2010 | Tsunemori | F24F 5/0035 165/104.29 |
| 2010/0316534 A1 | 12/2010 | Niazi | |
| 2010/0325956 A1 | 12/2010 | Dinu et al. | |
| 2010/0325957 A1 | 12/2010 | Klockow et al. | |
| 2012/0093683 A1 | 4/2012 | Hishida | A61L 9/122 422/4 |
| 2012/0153514 A1 | 6/2012 | Baxter et al. | |
| 2012/0318009 A1 | 12/2012 | Duesel, Jr. | B01D 1/305 62/121 |
| 2013/0319238 A1 | 12/2013 | Leung | F01N 3/04 95/226 |
| 2015/0198072 A1 | 7/2015 | Alasmari | B01D 50/006 60/274 |

FOREIGN PATENT DOCUMENTS

| | | | | |
|---|---|---|---|---|
| DE | 2602008 A1 | 7/1976 | | B01D 3/346 |
| DE | 4220850 C1 | 10/1993 | | |
| DE | 4314788 C1 | 8/1994 | | B01D 47/10 |
| DE | 4338177 A1 | 5/1995 | | A47L 9/181 |
| DE | 29518530 U1 | 1/1996 | | B01D 50/006 |
| DE | 19526980 A1 | 1/1997 | | B01D 53/14 |
| DE | 10153452 A1 | 11/2001 | | |
| DE | 10153452 A1 | 5/2003 | | A62C 99/0018 |
| DE | 102006037718 A1 | 2/2008 | | B01D 47/02 |
| EP | 1160518 A1 | 12/2001 | | F24F 6/04 |
| FR | 1397491 A | 4/1965 | | F28C 3/10 |
| FR | 2723433 A1 | 2/1996 | | B01D 50/008 |
| FR | 2746666 A1 | 10/1997 | | B01D 47/021 |
| GB | 905048 A | 9/1962 | | F28C 3/06 |
| JP | 52-3766 A | 1/1977 | | |
| JP | 62-042725 A | 2/1987 | | |
| JP | 62069033 A | 3/1987 | | |
| JP | 62106819 A | 5/1987 | | |
| JP | 02-040202 A | 2/1990 | | |
| JP | 03225130 A | 10/1991 | | |
| JP | 2007000736 A | 1/2007 | | |
| JP | 2011025226 A | 2/2011 | | |
| WO | WO-9831970 A1 | 7/1998 | | F24F 3/1603 |
| WO | WO-0190001 A1 | 11/2001 | | C02F 1/4674 |
| WO | 2006138287 A2 | 12/2006 | | |
| WO | WO-2008062845 A1 | 5/2008 | | F24F 5/0035 |
| WO | WO-2009153404 A1 | 12/2009 | | B01D 53/185 |
| WO | WO-2011162023 A1 | 12/2011 | | B01D 53/323 |
| WO | WO-2013039329 A2 | 3/2013 | | F24F 6/14 |

OTHER PUBLICATIONS

JP523766 English Machine Translation (Year: 1977).
WO2013039329 English Machine Translation (Year: 2013).
Notice of Reasons of Refusal (translated) from corresponding JP 2017524340 dated Sep. 6, 2019.
Notice of Reasons of Refusal (original) from corresponding JP 2017524340 dated Sep. 6, 2019.

(56) References Cited

OTHER PUBLICATIONS

Singapore Search Report dated May 25, 2018 for Singapore Application No. 11201703703S filed Nov. 6, 2015.
International Search Report dated Jan. 9, 2016 for International Application No. PCT/FR2015/053001 filed Nov. 6, 2015.

DEVICE FOR PRODUCING AND TREATING A GAS STREAM THROUGH A VOLUME OF LIQUID, AND FACILITY AND METHOD IMPLEMENTING SAID DEVICE

CROSS REFERENCE TO RELATED APPLICATIONS

This application is a continuation of U.S. application Ser. No. 15/524,862, filed on 5 May 2017, that in turn claims benefit of International Application Number PCT/FR2015/053001, filed 6 Nov. 2015; the contents of which are hereby incorporated by reference.

TECHNICAL FIELD

The present invention relates to the production and treatment of a stream of air through a volume of liquid. It is applicable in varied fields, for example, and non-exhaustively, the recovery of calories in a gas stream, and in particular in a hot air stream or in industrial fumes, the production of a gas stream that is heated or cooled upon passing through said volume of liquid, producing a gas stream whose temperature is controlled and/or whose absolute humidity is controlled, the humidification or dehumidification of a gas stream, the cleanup or filtering of a gas stream, the heating or air-conditioning of a site or industrial, service sector or household building, control of the hygrometry of a site or industrial, service sector or household building. The produced gas stream can also be used to cool, heat, humidify, or dehumidify any type of object or surface.

PRIOR ART

The use of a liquid, for example water, to treat, and in particular to heat or cool, a gas stream by heat exchange between the liquid and the gas stream, with placement of the gas stream and the liquid in direct contact, is an old technique, which has the advantage of being eco-friendly, since it in particular avoids implementing heat transfer fluids of the coolant type. The heating or cooling of the gas stream, and in particular an air stream, can for example be intended to produce a gas stream having a controlled temperature and/or intended to produce a gas stream having a controlled absolute humidity.

A first known solution for carrying out this technique consists of passing the gas stream through a curtain of fine droplets of the liquid or through an exchange surface permeable to the gas and containing this liquid, for example a textile material imbibed with water, or circulating the gas stream in contact with moistened plates. The main drawback of this type of solution lies in the very low energy yield of the heat exchange between the liquid and the gas stream, and the low air flow rates able to be obtained.

A second known solution consists of passing the gas stream, and in particular the air stream, directly through a volume of liquid contained in an enclosure, by injecting the air stream in the liquid volume, below the surface of said liquid volume. This type of solution is for example described in international patent application WO 2006/138287, American U.S. Pat. No. 4,697,735 (FIG. 3), and German patent application DE 101 53 452. This second technical solution has the advantage of making it possible to achieve an energy yield of the heat exchanges between the liquid and the gas stream higher than the first technical solution. Nevertheless, the solutions described in these publications do not make it possible to work with high gas flow rates, and do not make it possible to treat large volumes of gas quickly, and the energy yield of the heat exchanges between the liquid and the gas flow remains low. More particularly, the solutions described in these publications are for example not suitable for effectively and quickly cooling gas streams at high temperatures, for example industrial fumes, or for quickly and effectively recovering calories in a gas stream.

In American U.S. Pat. No. 5,908,491, a device is also proposed making it possible to clean the air by passing it in a volume of water so as to filter the dust contained in the air. This device includes a closed enclosure, which contains said volume of water, and which is placed under vacuum so as to aspirate air from the outside and create, by aspiration, a stream of air passing through the volume of water contained in the enclosure. This solution does not make it possible to work with high air flow rates. Furthermore, it is not used, and is also not suitable, to effectively perform a calorie transfer between the stream of air and the volume of water with high air flow rates.

OBJECT OF THE INVENTION

One object of the invention is to propose a new technical solution that makes it possible to improve the production and treatment of the gas stream through a volume of liquid contained in an enclosure, and in particular that allows effective treatment of a gas stream with high flow rates.

BRIEF DESCRIPTION OF THE INVENTION

The invention thus first relates to a device for producing and treating a gas stream, said device including an enclosure, of which the lower part is submerged in a liquid supply open at the top and includes at least one liquid intake opening, which makes it possible to place the lower part of the enclosure in communication with the liquid supply, such that the submerged lower part of the enclosure contains a volume of this liquid, on the one hand, and which includes at least one opening for discharging a gas stream, positioned above the surface of the volume of liquid contained in the enclosure, on the other hand; the device further includes means for producing and injecting a gas stream including at least one injection conduit, of which a lower part is submerged in the volume of liquid contained in the submerged lower part of the enclosure, and extends in the upper part inside the enclosure outside said volume of liquid; said injection conduit includes, in its submerged lower part, at least one discharge opening positioned below the surface of said volume of liquid; said means for producing and injecting a gas stream include a compressor connected to the non-submerged part of the injection conduit or to the discharge opening of the enclosure, and make it possible, during operation, to create and introduce an incoming gas stream, coming from outside the enclosure, in the non-submerged part of the injection conduit, with a flow rate of at least 100 m³/h, and such that said incoming gas stream passes through the discharge opening of the submerged lower part of the injection conduit, and is introduced into said volume of liquid contained in the submerged lower part of the enclosure, below the surface of said volume of liquid, and such that an outgoing gas stream, treated by direct contact with said volume of liquid, rises inside the enclosure outside the injection conduit and is discharged outside said enclosure, passing through the discharge opening of the enclosure.

A second object of the invention relates to a device for producing and treating a gas stream, said device including an enclosure, of which the lower part is submerged in a liquid supply and includes at least one liquid intake opening, which makes it possible to place the lower part of the enclosure in communication with the liquid supply, such that the submerged lower part of the enclosure contains a volume of this liquid, on the one hand, and which includes at least one opening for discharging a gas stream, positioned above the surface of the volume of liquid contained in the enclosure, on the other hand; the device further includes means for producing and injecting a gas stream including at least one injection conduit, of which a lower part is submerged in the volume of liquid contained in the submerged lower part of the enclosure, and extends in the upper part inside the enclosure outside said volume of liquid; said injection conduit includes, in its submerged lower part, at least one discharge opening positioned below the surface of said volume of liquid; said means for producing and injecting a gas stream include a compressor connected to the non-submerged part of the injection conduit, and make it possible, during operation, to create and introduce an incoming gas stream, coming from outside the enclosure, in the non-submerged part of the injection conduit, with a flow rate of at least 100 $m^3/h$, and such that said incoming gas stream passes through the discharge opening of the submerged lower part of the injection conduit, and is introduced into said volume of liquid contained in the submerged lower part of the enclosure, below the surface of said volume of liquid, and such that an outgoing gas stream, treated by direct contact with said volume of liquid, rises inside the enclosure outside the injection conduit and is discharged outside said enclosure, passing through the discharge opening of the enclosure.

A third object of the invention relates to a device for producing and treating a gas stream, said device including an enclosure, of which the lower part is submerged in a liquid supply and includes at least one liquid intake opening, which makes it possible to place the lower part of the enclosure in communication with the liquid supply, such that the submerged lower part of the enclosure contains a volume of this liquid, on the one hand, and which includes at least one opening for discharging a gas stream, positioned above the surface of the volume of liquid contained in the enclosure, on the other hand; the device further includes means for producing and injecting a gas stream including at least one injection conduit, of which a lower part is submerged in the volume of liquid contained in the submerged lower part of the enclosure, and extends in the upper part inside the enclosure outside said volume of liquid; said injection conduit includes, in its submerged lower part, at least one discharge opening positioned below the surface of said volume of liquid; said means for producing and injecting a gas stream make it possible, during operation, to create and introduce an incoming gas stream, coming from outside the enclosure, in the non-submerged part of the injection conduit, with a flow rate of at least 100 $m^3/h$, and without modifying the outside pressure above the liquid of the supply outside the enclosure, and such that said incoming gas stream passes through the discharge opening of the submerged lower part of the injection conduit, and is introduced into said volume of liquid contained in the submerged lower part of the enclosure, below the surface of said volume of liquid, and such that an outgoing gas stream, treated by direct contact with said volume of liquid, rises inside the enclosure outside the injection conduit and is discharged outside said enclosure, passing through the discharge opening of the enclosure.

The invention also relates to a facility making it possible to recover calories in an incoming gas stream, said facility including one or the other of the aforementioned devices, wherein the temperature of the liquid is lower than the temperature of the incoming gas stream in the enclosure, and an energy recovery system making it possible to recover at least part of the calories captured in the liquid from the supply of said device.

The invention also relates to a facility including at least two upstream and downstream facilities for recovering calories in a gas stream previously described, which are mounted in a cascade, such that the gas stream leaving the device of the upstream facility is at least partially, and preferably completely, used as incoming gas stream of the device of the downstream facility.

Another object of the invention is a method for heating and/or cooling and/or humidifying and/or dehumidifying a site, using at least one aforementioned device, which is arranged such that the incoming gas stream that is introduced into the enclosure of the device is an air stream, and the air stream leaving the device is introduced inside the site.

Another object of the invention is a method for producing a gas stream, in particular an air stream, from an incoming gas stream, and in particular an incoming air stream, in which an aforementioned facility is used, and for heating, at least part of the calories captured in the liquid supply is used.

Another object of the invention is a method for recovering calories in the air of a site or dehumidifying a site with calorie recovery, using an aforementioned facility, in which the incoming gas stream that is introduced into the enclosure of the device of the facility is an air stream coming at least partially from the inside of the site.

Another object of the invention is a method for creating a buffer zone inside the site in which the humidity and/or dust content is controlled, characterized in that an aforementioned device is used that is arranged such that the incoming gas stream in the enclosure of the device is an air stream, at least partially from outside the site, and wherein the air stream leaving the enclosure of the device is introduced at least partially into the site.

Another object of the invention is a method for filtering and/or cleaning up the gas stream, and in particular an air stream, using at least one aforementioned device, or aforementioned facility, such that an incoming gas stream containing particles and/or pollutants is introduced into the enclosure of the device and at least part of these particles and/or pollutants are captured in the liquid of the supply of the device.

More particularly, the incoming gas stream contains industrial fumes, and in particular high-temperature industrial fumes.

According to a second aspect, the invention aims to propose a new technical solution allowing effective recovery of the calories in a gas stream by implementing high gas stream flow rates.

The invention thus also relates to a facility making it possible to recover calories in an incoming gas stream and including a device for producing and treating said incoming gas stream (F) and an energy recovery system; said device includes an enclosure, which contains a volume of liquid whose temperature is below the temperature of the gas stream entering the enclosure, and which includes at least one opening for discharging a gas stream positioned above the surface of said volume of liquid; said device further includes means for producing and injecting a gas stream that make it possible, during operation, to create and introduce the incoming gas stream, coming from outside the enclosure, into said volume of liquid contained in the enclosure, below the surface of said volume of liquid, such that an outgoing gas stream, treated by direct contact with said volume of liquid, rises inside the enclosure and is discharged outside said enclosure, passing through the discharge opening of the enclosure; said energy recovery system makes it possible to recover at least part of the calories captured in the liquid; the means for producing and injecting a gas stream include at least one injection conduit, a lower part of which is submerged in the volume of liquid contained in the enclosure, and extends at the upper part to the inside of the enclosure outside said volume of liquid; said injection conduit includes, in its submerged lower part, at least one discharge opening positioned below the surface of said volume of liquid; the means for producing and injecting a gas stream include a compressor and make it possible to create and introduce said incoming gas stream (F) in the non-submerged part of said injection tube with a flow rate of at least 100 m$^3$/h.

The invention also relates to a facility making it possible to recover calories in an incoming gas stream and including a device for producing and treating said incoming gas stream and an energy recovery system; said device includes an enclosure, which contains a volume of liquid whose temperature is lower than the temperature of the gas stream entering the enclosure, and which includes at least one discharge opening for a gas stream positioned above the surface of said liquid volume; said device further includes means for producing and injecting a gas stream that make it possible, during operation, to create and introduce the incoming gas stream, coming from outside the enclosure, into said volume of liquid contained in the enclosure, below the surface of said volume of liquid, and such that an outgoing gas stream, treated by direct contact with said volume of liquid, rises inside the enclosure and is discharged outside said enclosure while passing through the discharge opening of the enclosure; said system making it possible to recover at least part of the calories captured in the liquid; the enclosure includes one or several baffles, which make it possible to circulate the gas stream leaving the volume of liquid up to the discharge opening, by causing it to undergo one or several changes of direction, so as to prevent liquid from being sprayed through the discharge opening.

According to this second aspect, the invention also relates to:

a facility including at least two upstream and downstream facilities for recovering calories in a gas stream that were described above, and which are mounted in a cascade, such that the gas stream leaving the device of the upstream facility is at least partially, and preferably completely, used as incoming gas stream for the device of the downstream facility;

a method for producing a gas stream, in particular an air stream, from an incoming gas stream, and in particular an incoming air stream, in which an aforementioned facility is used, and at least some of the calories captured in the liquid are used for heating;

a method for recovering calories in the air of a site or dehumidifying a site with calorie recovery, using an aforementioned facility, and in which the incoming gas stream that is introduced into the enclosure of the device of the facility is an air stream, at least partially from inside the site;

a method for creating a buffer zone inside a site in which the humidity and/or the dust content is controlled, characterized in that an aforementioned facility is used, the device of the facility being arranged such that the incoming gas stream in the enclosure of the device is an air stream, at least partially from outside the site, and the outgoing air stream of the enclosure of the device is at least partially introduced into the site;

a method for filtering and/or cleaning up a gas stream, and in particular an air stream, using an aforementioned facility, and wherein an incoming gas stream containing particles and/or pollutants is introduced into the enclosure of the device of the facility and at least part of these particles and/or pollutants is captured in the liquid of the device.

BRIEF DESCRIPTION OF THE FIGURES

The features and advantages of the invention will appear more clearly upon reading the following detailed description of several specific alternative embodiments of the invention, these particular alternative embodiments being described as non-limiting and non-exhaustive examples of the invention, and in reference to the appended drawings, in which.

DETAILED DESCRIPTION OF THE INVENTION

Figure 1:
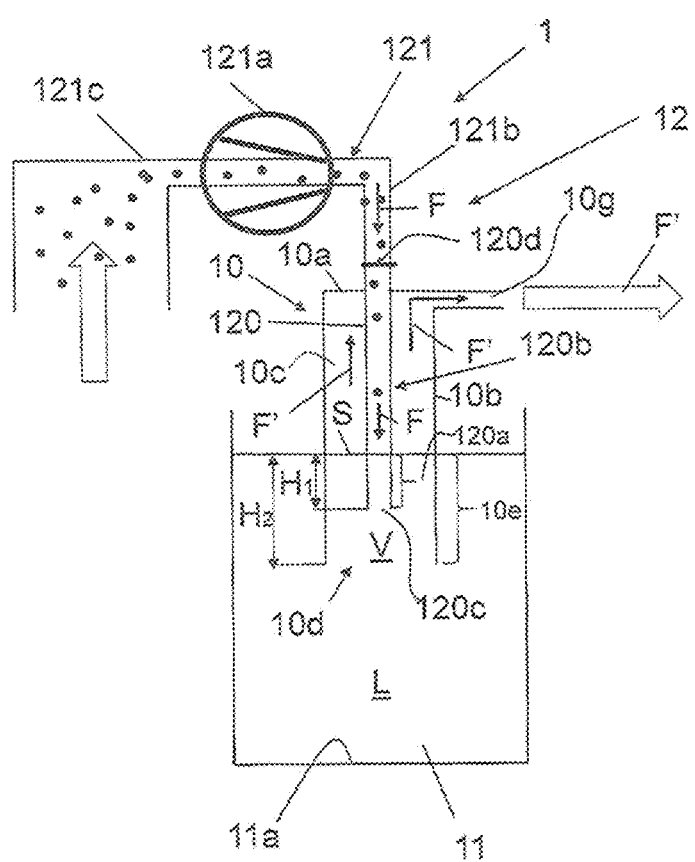
FIG. 1 schematically shows a first alternative embodiment of the device according to the invention making it possible to produce and treat a gas stream through a volume of liquid.

In reference to the specific alternative embodiment of FIG. 1, the device 1 for producing and treating a gas stream includes an enclosure 10, or a supply 11 of liquid L open in the upper part, and for example a water supply, and means 12 for producing and injecting an incoming gas stream F in a volume V of liquid contained in the enclosure 10.

The invention is not limited to the implementation of water as liquid L, but extends to any other type of liquid. As non-limiting and non-exhaustive examples, it may be interesting to use a liquid L whose solidification temperature at atmospheric pressure is lower than 0° C., for example water containing additives, such as salts, carbohydrates, glycol. It may also be interesting to use oil as the liquid L.

The enclosure 10 comprises an upper wall 10a and a side wall 10b defining an inner chamber 10c, and includes, at its lower end, a liquid intake opening 10d with a large section. In another alternative, this opening 10d with a large section could be replaced by several liquid intake openings with a smaller section.

The lower part 10e of the enclosure 10 is submerged in the volume of liquid L contained in the supply 11, without touching the bottom 11a of the liquid supply 11.

The liquid intake opening 10d makes it possible to place the lower part 10e of the enclosure 10 in communication with the liquid supply 11, such that the submerged lower part 10e of the enclosure contains part of this liquid L, in the form of a volume V of liquid.

The enclosure 10 also comprises at least one discharge opening 10g for a gas stream, which is positioned above the surface S of the volume V of liquid contained in the enclosure 10, and which, in the illustrated example, is arranged near the upper wall 10a of the enclosure 10.

The means 12 for producing and injecting a gas flow F include at least one injection conduit 120, a lower part of which 120a is submerged in the volume V of liquid contained in the submerged lower part 10e of the enclosure 10, and extends in the upper part inside the enclosure 10 outside said volume V of liquid.

In this particular example, this injection conduit 120 is formed by a vertical rectilinear tube, which crosses through the upper wall 10a of the enclosure 10, and which is open at both its upper and lower ends.

This injection conduit 120 thus includes, in its submerged lower part 120a, at least one discharge opening 120c positioned below the surface S of said volume V of liquid, and above the level of the liquid intake opening 10d of the submerged lower part 10e of the enclosure 10.

The submersion depth H1 of the injection conduit 120 and the liquid, i.e., the distance H1 between the opening 120c and the surface S of the volume V of liquid, is smaller than the submersion depth H2 of the enclosure in the liquid supply 11, i.e., the height H2 of the volume V of liquid in the enclosure 10.

The means 12 for producing and injecting a gas stream F further include aeraulic means 121, which, during operation, make it possible to create and introduce an incoming gas stream F, coming from outside the enclosure 10, in the non-submerged upper part 120b of the injection conduit. In the particular alternative of FIG. 1, these aeraulic means 121 more particularly include a gas compressor 121a, the outlet of which is connected to the upper intake opening 120d of the injection conduit 120 by a channel 121b, and the intake of which is connected to an intake tubing 121c communicating with the outside of the enclosure 10. This compressor 121a makes it possible to create a gas stream F by aspiration, and to introduce this pressurized gas stream F into the injection conduit 120 through the upper intake opening 120d of the injection conduit 120.

The compressor 121a may be known type of gas compressor making it possible to create a gas stream (centrifugal fan, axial fan, pump, etc.).

The invention advantageously makes it possible to work with a gas flow rate at the outlet of the compressor 121a that may be high, and in particular greater than 100 m³/h, more particularly greater than 1,000 m³/h, and still more particularly, in certain applications, greater than 10,000 m³/h.

When the compressor 121a is operating, the gas stream F created by the compressor 121a is introduced, under pressure, into the injection conduit 120 through the upper intake opening 120d of this conduit, passes through the discharge opening 120c of the submerged lower part of the injection conduit 120, and is introduced into said volume V of liquid contained in the submerged lower part 10e of the enclosure 10, below the surface S of said volume V of liquid, without modifying the outside pressure above the liquid L of the supply 11 outside the enclosure 10. Thus, in the particular case that is illustrated, when the compressor 121a is operating, the outside pressure above the liquid L of the supply 11 outside the enclosure 10 is not modified and remains equal to the atmospheric pressure.

More particularly, the gas stream F is introduced into said volume of liquid V while being oriented downward.

The compressor 121a is selected so as to create a gas stream F with a pressure in the injection conduit 120, above the liquid, that is higher than the liquid column H1 in the submerged part 120a of the injection conduit 120, such that the gas can be discharged in the volume V of liquid outside the injection conduit 120.

The gas that is introduced into the volume of liquid V passes through the volume V of liquid while rising toward the surface S of said volume of liquid V, under the effect of the speed of the gas and the buoyancy, and emerges inside the enclosure 10 and outside the injection conduit 120 while forming an outgoing gas flow F', which has been treated by direct contact with said volume V of liquid. This outgoing gas flow F' rises inside the enclosure 10, outside the injection conduit 120, and is discharged outside said enclosure 10 while passing through the discharge opening 10g of the enclosure 10.

More particularly, the submersion depths H1 and H2 are sized, in particular relative to the pressure of the gas in the injection conduit 120 above the liquid, such that all of the gas, which is introduced in the volume V of liquid contained in the submerged lower part 10e of the enclosure 10, rises in the volume of liquid V and emerges in the enclosure 10 above the liquid and outside the injection conduit 120, without part of the gas passing through the lower intake opening 10d of the enclosure 10, in the volume of liquid situated outside the enclosure 10. When the temperature of the volume of liquid V in the enclosure 10 is different from the temperature of the gas stream F before it is introduced into the volume V of liquid, heat exchanges occur between the gas and the liquid through sensible heat and latent heat.

When the temperature $T_{Liquid}$ of the volume of liquid is below the initial temperature $T_{Initial}$ of the gas stream F before introduction in the volume of liquid, the gas stream F' is cooled. More particularly, the temperature of the outgoing gas stream F' is substantially the temperature $T_{Liquid}$ of the volume of liquid. This concomitantly results in the air stream of gas F' leaving the device 1 being dehumidified relative to the incoming gas stream F, the absolute humidity (water weight per volume of air) in the outgoing gas stream F' being lower than the absolute humidity of the incoming gas stream F.

Conversely, when the temperature $T_{Liquid}$ of the volume of liquid is higher than the initial temperature $T_{Initial}$, the outgoing gas stream F' is heated. This concomitantly results in the outgoing gas stream F' leaving the device 1 having been humidified relative to the incoming gas stream F, the absolute humidity (water weight per volume of air) in the outgoing gas stream F' being higher than the absolute humidity of the incoming gas stream F.

The submersion depth H1 is of the injection conduit 120 must be large enough for the treatment of the gas stream by passing through the volume of liquid V, and more particularly for, if applicable, the heat transfer between the liquid and the gas injected into the volume of liquid V to be effective and sufficient, and if necessary to allow the gas stream F' cooled or heated by the liquid to be at a temperature close to, and preferably substantially identical to, that of the liquid. Conversely, this submersion depth H1 must not be too great so as to avoid oversizing the compressor 121a. The depth H1 is thus preferably comprised between 20 mm and 200 mm, and is preferably comprised between 30 mm and 50 mm. The invention is not, however, limited to these specific values.

Likewise, for better effectiveness, the height H2 of the liquid volume V must preferably not be too great, and will preferably be less than 500 mm, and more particularly comprised between 40 mm and 500 mm. The invention is not, however, limited to these particular values.

In another application, the device 1 according to the invention can be used to filter or clean up the incoming gas stream F by passing through a volume of liquid V. In this application, the temperature of the liquid volume can be higher or lower than the temperature of the incoming gas stream F, or be substantially equal to the temperature of the incoming gas stream F. When the temperature of the liquid volume is substantially equal to the temperature of the incoming gas stream F, at the outlet of the device 1, a filtered or cleaned up outgoing gas stream F' is produced that has not been heated or cooled, but is substantially at the same temperature as the incoming gas stream F.

Figure 2:
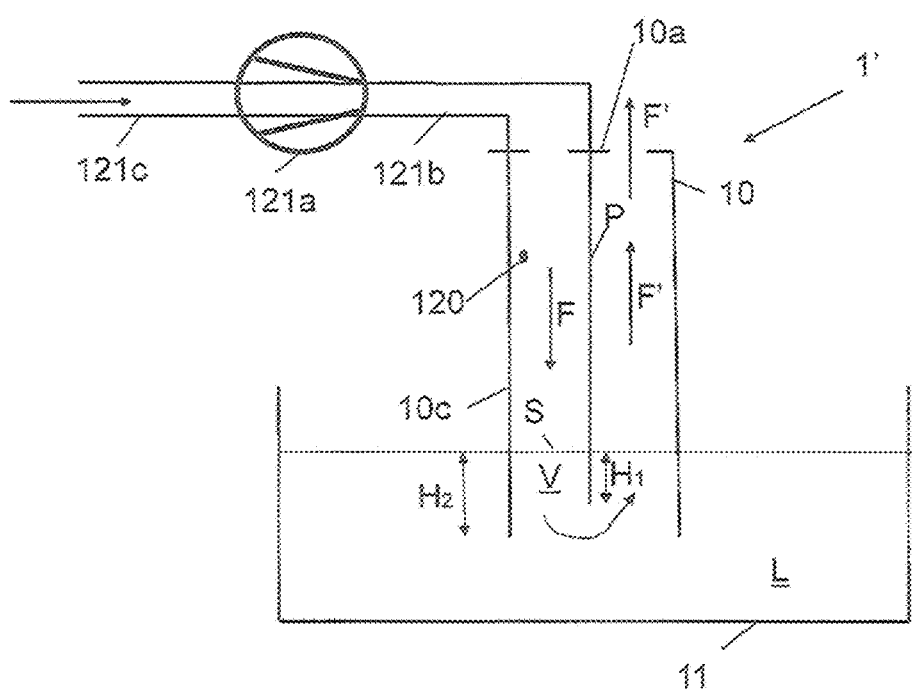
FIG. 2 schematically shows a second alternative embodiment of the device according to the invention making it possible to produce and treat a gas stream through a volume of liquid.

FIG. 2 shows another alternative embodiment of a device 1' according to the invention in which the injection conduit 120 is defined between a vertical wall P inside the enclosure 10 and by a part of the side wall 10c of the enclosure 10.

Figure 3:
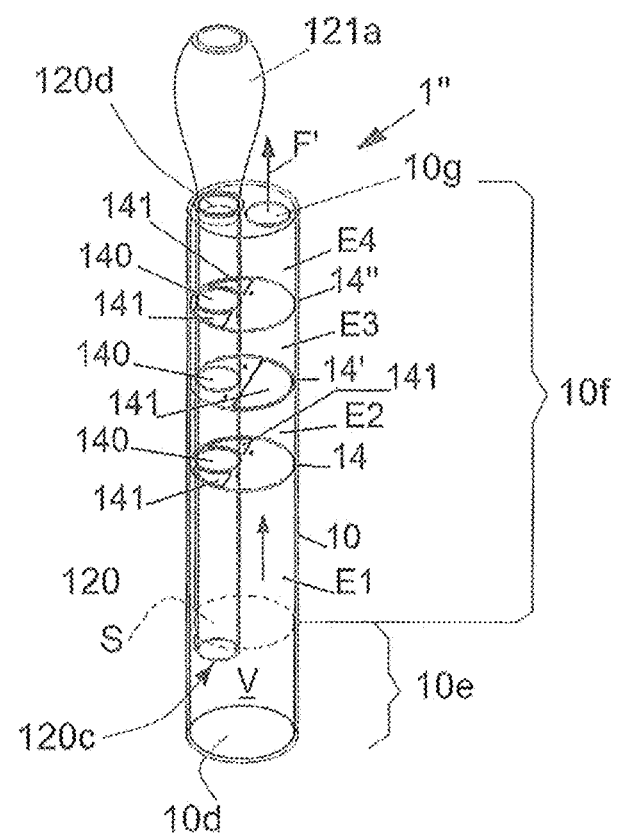
FIG. 3 schematically shows a third alternative embodiment of part of the device according to the invention making it possible to produce and treat a gas stream through a volume of liquid.

FIG. 3 shows another alternative embodiment of a device 1" according to the invention, only the enclosure 10 and the compressor 121a being shown in this figure, the liquid supply 11 not being shown. In this alternative, the side wall 10c of the enclosure 10 is tubular, but could have any other geometry in the context of the invention.

In this alternative of FIG. 3, the enclosure 10 includes, in its upper part 10f that is not intended to be submerged in a liquid, several plates 14, 14', 14" serving as baffles. These plates 14, 14', 14" are fastened to the inside of the enclosure 10, one above the other, with a space between plates 14, so as to form several superimposed chambers E1, E2, E3 and E4. Each plate 14, 14', 14" is in sealed contact over the entire periphery with the side wall 10c of the enclosure 10. During operation, when the lower part of the enclosure is submerged in a liquid supply, the first chamber E1 is defined by the surface of the volume V of liquid to be contained inside the enclosure and the lower plate 14. The second chamber E2 is defined by the lower plate 14 and the intermediate plate 14'. The third chamber E3 is defined by the intermediate plate 14' and the upper plate 14". The fourth chamber E4 is defined by the upper plate 14" and the upper wall 10a of the enclosure 10.

The number of plates 14, 14', 14" and chambers E1, E2, E3 and E4 is not limiting with respect to the invention, the device 1 being able to include a single plate 14 defining two chambers or more than three plates defining more than four chambers.

Each plate 14, 14, 14" includes a through opening 140 having substantially the same section as the injection conduit 120. These through openings 140 are aligned vertically, and the injection conduit 120 is passed through these openings 140, the conduit 120 being in sealed contact over the entire outer periphery with each plate 14, 14', 14" at each passage opening 140 of the tube.

Each plate 14, 14', 14" also includes at least one through opening 141 making it possible to place two adjacent chambers in communication with one another, and thus allowing the passage of a gas stream F' leaving the volume of liquid V from one chamber to the other from the lower chamber E1 to the discharge opening 101.

These openings 141 are vertically offset relative to one another and are not aligned with the air discharge opening 101 of the enclosure 10, so as to cause said air stream F' to undergo several changes of direction.

During operation, the lower part 10e of the enclosure 10 being submerged in a liquid supply 11, the air stream F' leaving the volume of liquid V rises inside the enclosure 10 while circulating through the baffles 14, 14', 14", and undergoing several successive changes of direction, then is discharged outside the enclosure 10 through the discharge opening 10g.

Figure 4:
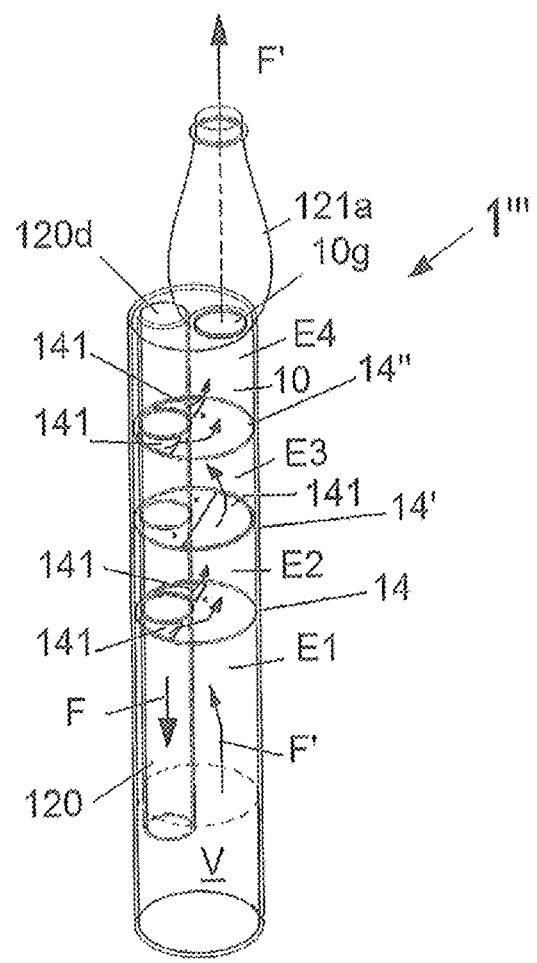
FIG. 4 schematically shows a fourth alternative embodiment of part of the device according to the invention making it possible to produce and treat a gas stream through a volume of liquid.

FIG. 4 shows another alternative that differs from that of FIG. 3 in that the air compressor 121a is connected to the air discharge opening 10g of the enclosure 10, and creates the gas stream F entering by aspiration through the intake opening 120d of the injection conduit 120, and no longer by blowing.

In the two alternatives of FIGS. 3 and 4, when the turbulence occurs in the volume of liquid V, this turbulence potentially being significant and being able to cause drops of liquid to be sprayed, which are driven by the outgoing gas stream F', the baffles 14, 14', 14" form an obstacle on the path of these drops and make it possible, owing to the successive changes in direction of the air imposed by the baffles, to prevent the liquid from being sprayed through the discharge opening 10g outside the enclosure at the same time as the outgoing air stream F. Owing to the baffles 14, 14', 14', no drop of liquid is spread outside the enclosure. As a result, advantageously, the flow rates of the air streams F and F' can be very high and/or the volume of the enclosure can be small, which reduces the bulk of the device, while avoiding spraying drops of liquid outside the enclosure of the device.

Figure 5:
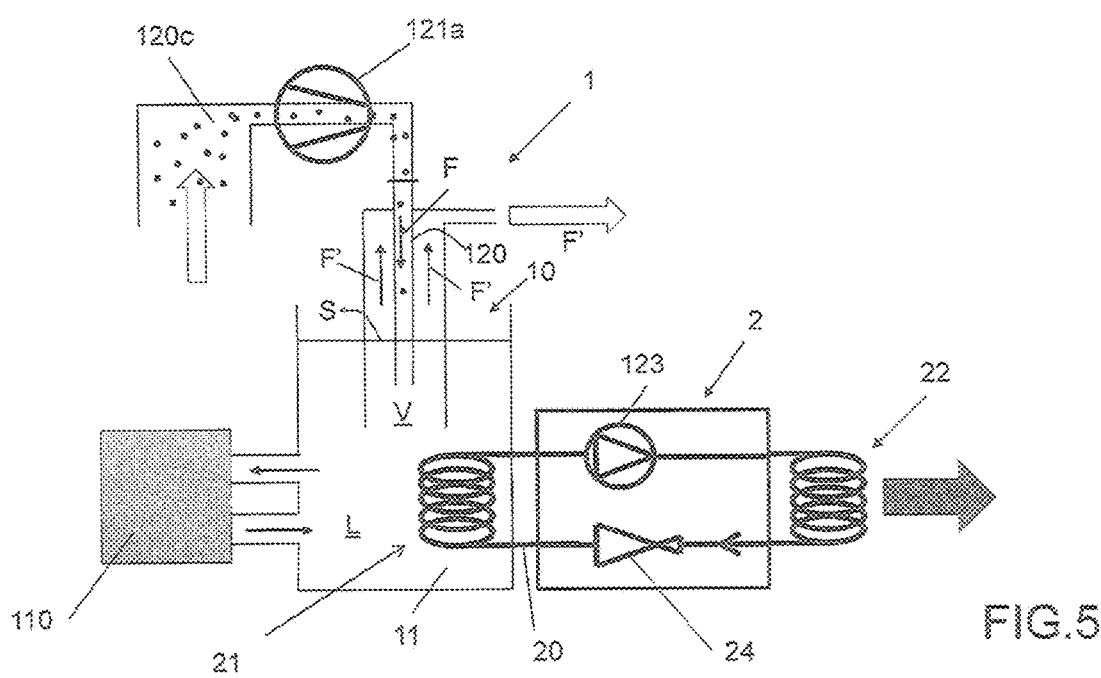
FIG. 5 schematically shows a first alternative of a facility implementing the device of FIG. 1, and making it possible to recover calories in a gas stream.

FIG. 5 shows a facility for recovering calories in a gas stream F, which implements the device 1 of FIG. 1. Of course, it is also possible, in order to produce this facility, to use the devices of FIGS. 2 to 4.

In this facility of FIG. 5, the supply 11 of liquid L is for example a water supply, and is optionally equipped with a water treatment unit 110 that for example makes it possible to keep the pH of the water at a controlled value, and for example a neutral pH, and/or to filter the water L to remove the impurities or pollutants. The facility is further equipped with a system 2, of the heat pump type, that allows the recovery of part of the calories from the liquid L of the supply 11.

This system 2 for recovering calories more particularly includes a heat transfer fluid circulating in a closed circuit 20. Said closed circuit 20 comprises an evaporator 21 submerged in the liquid L of the supply 11, a condenser 22 positioned outside the supply 11 of liquid, a compressor 23 inserted between the outlet of the evaporator 21 and the inlet of the condenser 22, an expander 24 inserted between the outlet of the condenser 22 and the inlet of the evaporator 21.

During operation, a hot and/or wet gas stream F is created by the compressor 121a by aspiration through the intake tubing 120c. This gas stream F is created by aspiration, for example from the surrounding air inside or outside a building, or so as to capture the hot and/or wet fumes produced by a chimney or an apparatus, and in particular by an industrial chimney.

The temperature $T_{Liquid}$ of the liquid L, and for example the water, in the supply 11 is lower than the initial temperature of the gas stream F. When it passes in the volume of liquid V contained in the enclosure 10 of the device, the gas is cooled and dehumidified, the gas F' leaving the device 1 being at a lower temperature than the incoming gas stream F and the absolute humidity (water weight per volume of air) in the outgoing gas stream F' being lower than the absolute humidity of the incoming gas stream F. This outgoing gas stream F' is for example oriented back toward the outside of the building or toward a zone (inside or outside) where one needs cold and less humidity.

When the gas passes in the volume of liquid V, it cedes calories to the volume of liquid V, owing on the one hand to the sensible heat related to the temperature deviation of the gas F and the liquid 11, and on the other hand to the latent heat related to the steam that is contained in the gas F and that condenses in the liquid 11. The greater the temperature difference is between the liquid 11 and the incoming gas stream F, the more calories one recovers in the liquid 11. These calories are captured by and distributed in the supply 11 of liquid with the largest volume. The increase in the temperature of the liquid L in the supply 11 resulting therefrom makes it possible to heat the heat transfer fluid, which circulates in vapor state in the evaporator 21. All or part of the calories contributed to the liquid L of the supply 11 by the incoming gas stream F are therefore recovered by heating the heat transfer fluid in the evaporator 21, which contributes to lowering the temperature of the liquid supply 11, and are transferred to the condenser 22 at which the heat transfer fluid condenses to the liquid state and returns the heat.

When the gas stream F contains pollutants soluble in the liquid in the supply 11 or particles (for example, gas stream F formed from polluting industrial fumes), the supply 11 of liquid L advantageously makes it possible to capture at least part of these pollutants or particles, and to produce a cleaner outgoing stream F.

The facility of FIG. 5 can more particularly be used to treat high-temperature industrial fumes (for example, at 1,000° C.) by cooling them to below 100° C., and cleaning them, and by recovering a significant portion of the calories from these industrial fumes via the supply 11 of liquid and the energy recovery system 2.

Figure 6:
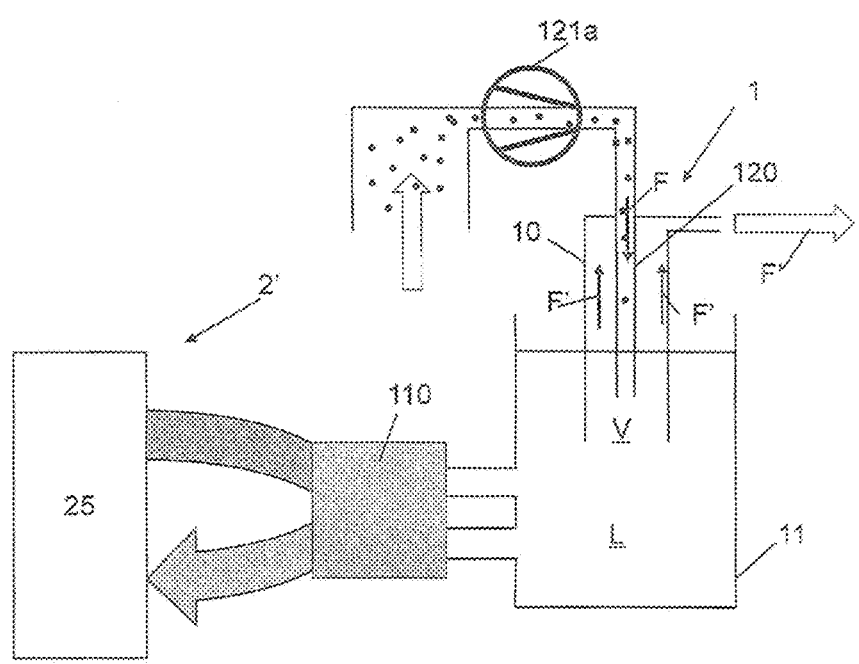
FIG. 6 shows a second alternative of a facility implementing the device of FIG. 1, making it possible to recover calories in a gas stream.

FIG. 6 shows an energy recovery facility, which differs from FIG. 5 in that the energy recovery system 2' directly uses the liquid L from the supply 11 as heat transfer liquid, and makes it possible to supply, in a closed loop, an energy storage reservoir 25 (for example, an additional liquid supply) or a device 25 (for example, heat pump or the like) making it possible to recover the calories stored in the liquid 11 by heat exchange. The energy recovery system 2' thus includes a closed circuit in which part of the liquid L of the supply serving as heat transfer fluid circulates.

Figure 7:
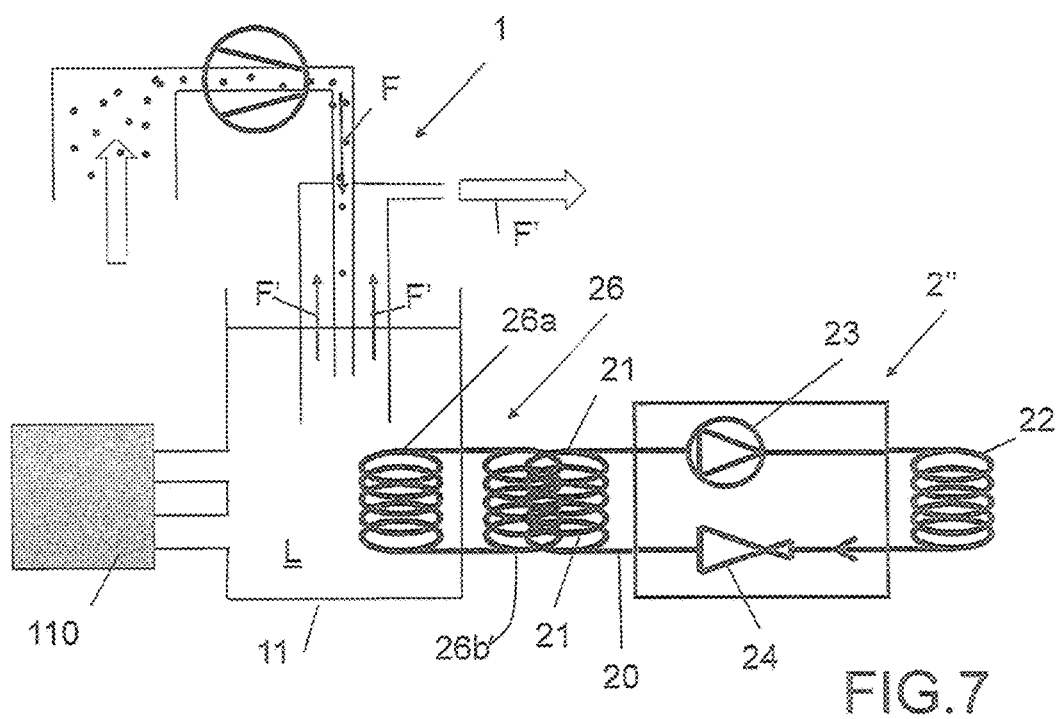
FIG. 7 schematically shows a third alternative of a facility implementing the device of FIG. 1, and making it possible to recover calories in a gas stream.

FIG. 7 shows a facility for recovering energy, which differs from FIG. 5 by the implementation, in the energy recovery system 2", of an intermediate exchanger 26 in which a heat transfer fluid circulates in a closed loop. One part 26a of the intermediate exchanger 26 is submerged in the liquid 11, and another part 26b is situated outside the liquid L and allows a heat transfer with the heat transfer fluid in the evaporator 21 to the outside of the supply 11 of liquid L.

NON-LIMITING EXAMPLE APPLICATIONS OF THE INVENTION OF THE FACILITIES OF FIGS. 5 TO 7

Example 1: Recycling Toward the Outside of Tainted Air Inside a Residence or a Site with Energy Recovery The air inside the residence or the site contains about 60% relative humidity and is at a temperature of about 20° C. The supply 11 contains water at a temperature of about 3° C. The energy recovered in the water per $m^3$ of air is:
Sensible heat: about 20 $KJ/m^3$
Latent heat: about 10 $KJ/m^3$ Example 2: Energy Recovery in Air Containing about 80% Relative Humidity and at a Temperature of about 50° C.

The supply 11 contains water at a temperature of about 6° C. The energy recovered in the water per $m^3$ of air is:
Sensible heat: about 54 $KJ/m^3$
Latent heat: about 152 $KJ/m^3$ FIG. 8 shows a multi-staged facility that includes two facilities I1, I2 that are similar to the facility of FIG. 5 and that are mounted in a cascade, the gas stream F' leaving the upstream facility I1 being used as incoming gas stream F for the downstream facility I2.

Figure 8:
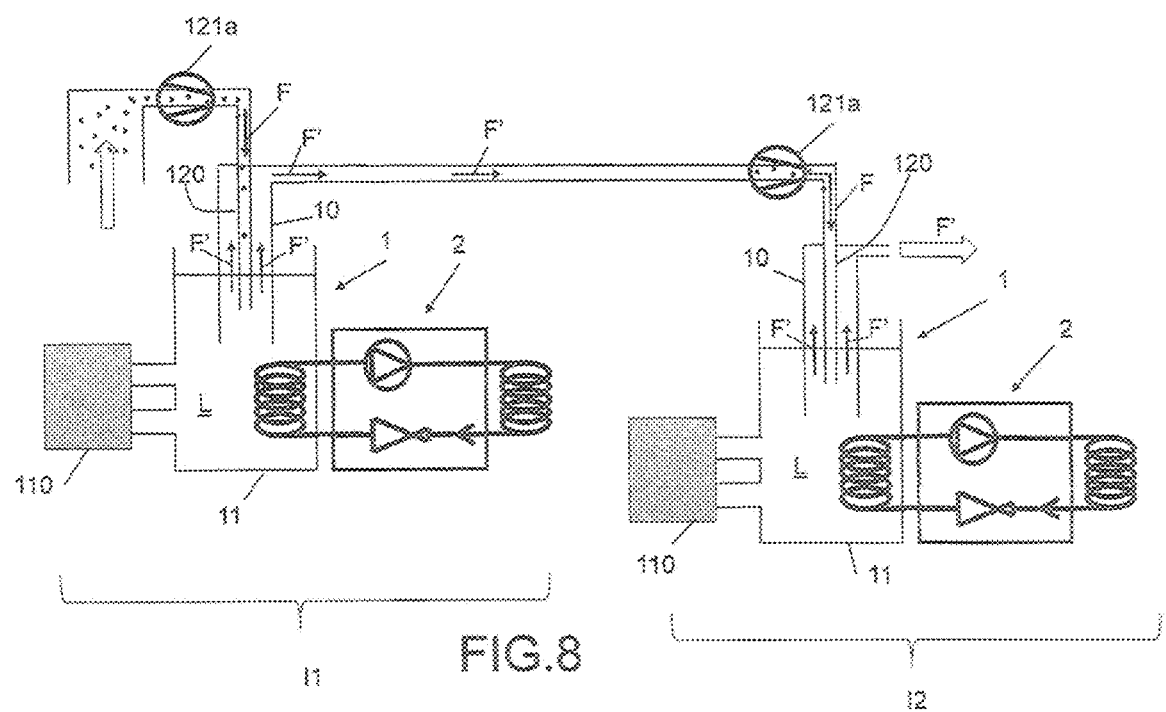
FIG. 8 schematically shows a fourth alternative of a facility implementing two devices of FIG. 1 in a cascade, and making it possible to recover calories in a gas stream.

This multi-staged facility of FIG. 8 is particularly suitable for cooling and recovering energy in several successive steps in high-temperature gas streams, for example industrial fumes.

Figure 9:
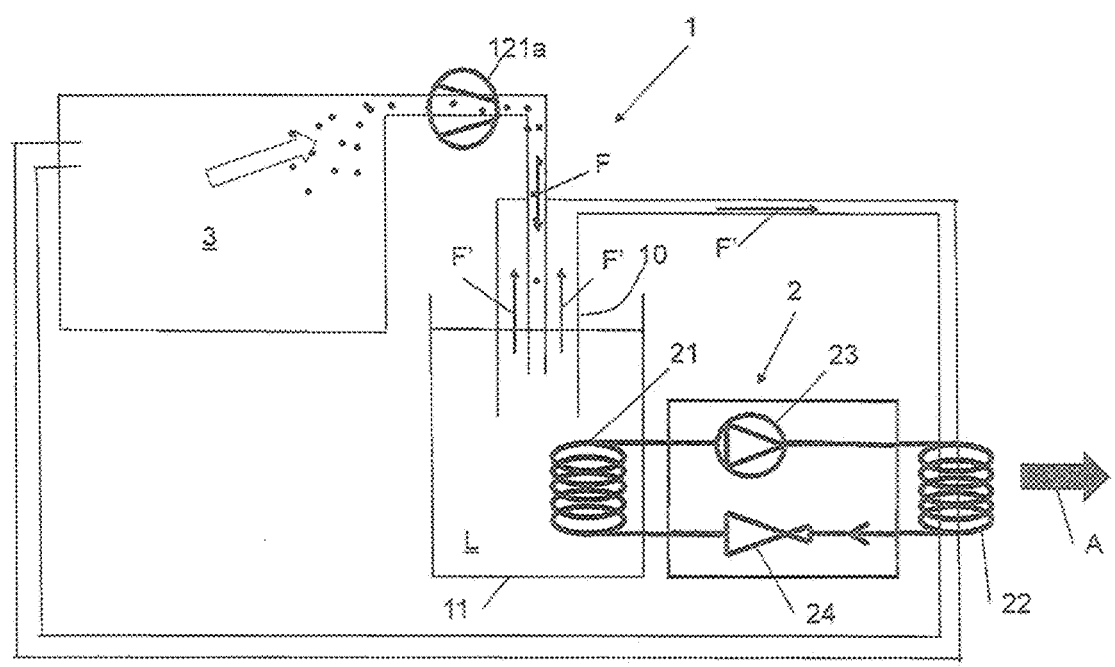
FIG. 9 schematically shows a fifth alternative of a facility implementing the device of FIG. 1, and making it possible to recover calories in a gas stream.

FIG. 9 shows an energy recovery facility, and if applicable, air dehumidification facility inside a site or residence 3, which operates in a closed circuit, the outgoing air stream F' that has been cooled, and if applicable dehumidified, being reinjected into said site 3. In this facility, the air that is reintroduced into the site is reheated beforehand by heat exchange with the condenser 22 of the energy recovery system 2. Another part of the energy transferred to the condenser 22 can be recovered elsewhere (arrow A).

Non-exhaustively and non-limitingly, the site 3 can for example be a covered pool. The site 3 can also be any type of site containing people or animals, the facility also allowing the recovery of energy from human or animal activities.

Figure 10:
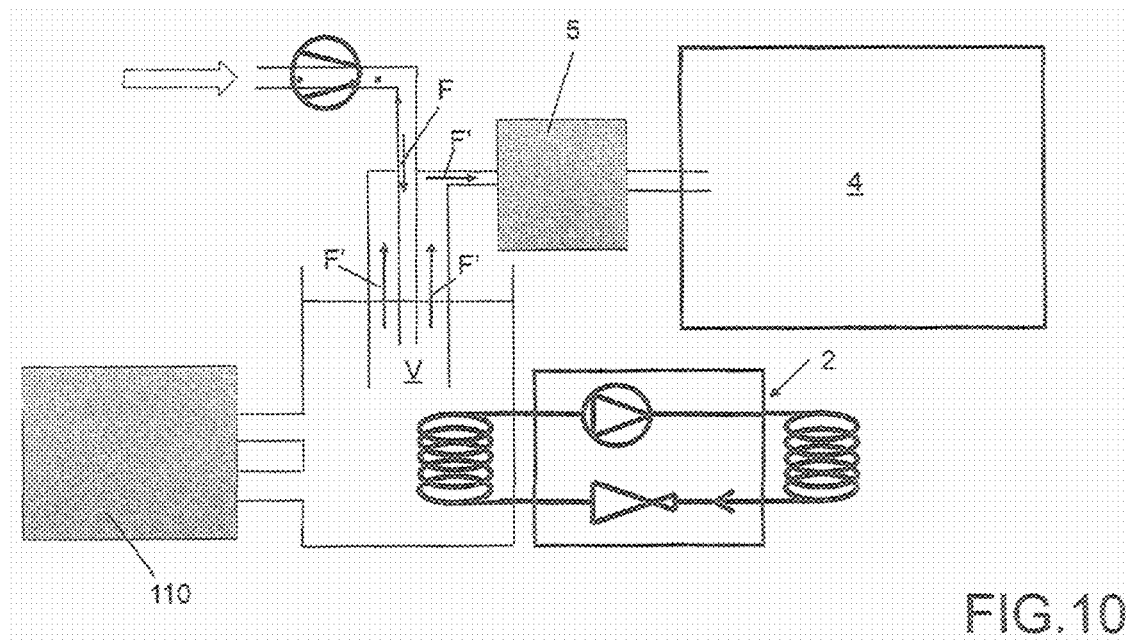
FIG. 10 schematically shows an alternative of a facility implementing the device of FIG. 1, and making it possible to create a buffer zone whose humidity or dust content is controlled.

FIG. 10 shows an energy recovery facility that makes it possible to create an inside buffer zone 4, in which the humidity or dust concentration in the air is controlled. In this facility, the outgoing air stream F' that has been dehumidified and/or filtered by passing in the volume V of water is heated by a heat treatment unit 5 before it is introduced into the inner buffer zone 4. In this facility, the energy recovery system 2 is optional.

In the alternative embodiments illustrated in the appended figures, the discharge opening 120c of the injection circuit 120 is positioned above the level of the liquid intake opening 10d of the lower submerged part 10e of the enclosure. In another alternative, the discharge opening 120c of the injection conduit 120 can be positioned at or below the level of the liquid intake opening 10d of the submerged lower part 10e of the enclosure 10.

In the alternative embodiments illustrated in the appended figures, the level of liquid L in the enclosure 10 is the same inside the injection conduit 120 or outside the injection conduit 120. In another alternative, it is possible to implement a hydraulic pump to pump liquid in the supply 11 and to introduce this pumped liquid into the enclosure 10, outside the injection conduit 120, such that the submersion depth H1 of the injection conduit 120 (i.e., the height H1 of liquid in the injection conduit 120) is constantly lower than the height H2 of liquid in the enclosure 10 and outside the injection conduit 120. In this case, the discharge opening 120c of the injection conduit 120 can be positioned at the same level as or below the level of the liquid intake opening 10d of the submerged lower part 10e of the enclosure 10.

In the alternative embodiment illustrated in the appended figures, the supply 11 is formed by an open tub in the upper part. In another alternative, the tub or equivalent means forming the supply 11 can be closed.

The invention claimed is:

1. A device for producing and treating a gas stream, said device including an enclosure, of which the lower part is submerged in a liquid bath outside the enclosure, the enclosure includes at least one liquid intake opening, said at least one liquid intake opening placing an internal chamber of the enclosure in fluid communication with the liquid bath, such that the submerged lower part of the enclosure contains a volume of the liquid bath, the enclosure includes at least one opening for discharging a gas stream positioned above the surface of the volume of liquid contained in the submerged lower part of the enclosure, the device further including means for producing and injecting a gas stream including at least one injection conduit, of which a lower part is submerged in the volume of liquid contained in the submerged lower part of the enclosure, the at least one injection conduit extends in the upper part inside the enclosure above said volume of liquid contained in the submerged lower part of the enclosure, the submersion depth of the injection conduit being between 20 mm and 200 mm, and said injection conduit including, in said submerged lower part of the injection conduit, at least one discharge opening positioned below the surface of said volume of liquid contained in the submerged lower part of the enclosure, said means for producing and injecting a gas stream include a compressor connected to the discharge opening of the enclosure, and said compressor, during operation, creates and introduces an incoming gas stream, coming from outside the enclosure, in the non-submerged part of the injection conduit, with a flow rate of at least 100 $m^3/h$, and such that said incoming gas stream passes through the discharge opening of the submerged lower part of the injection conduit, and is introduced into said volume of liquid contained in the submerged lower part of the enclosure, below the surface of said volume of liquid, and such that an outgoing gas stream, treated by direct contact with said volume of liquid, rises inside the enclosure outside the injection conduit and is discharged outside said enclosure, passing through the discharge opening of the enclosure; and
    wherein the liquid bath, outside the enclosure, is at atmospheric pressure, including during the operation of the means for producing and injecting the incoming gas stream or wherein the discharge opening of the injection conduit is positioned at the same level as the liquid intake opening of the submerged lower part of the enclosure or above the level of the liquid intake opening of the submerged lower part of the enclosure.

2. The device according to claim 1, wherein the liquid bath, outside the enclosure, is at atmospheric pressure, including during the operation of the means for producing and injecting the incoming gas stream and wherein the discharge opening of the injection conduit is positioned at the same level as the liquid intake opening of the submerged lower part of the enclosure or above the level of the liquid intake opening of the submerged lower part of the enclosure.

3. A device for producing and treating a gas stream, said device including an enclosure, of which the lower part is submerged in a liquid bath outside the enclosure, the enclosure includes at least one liquid intake opening, said at least one liquid intake opening placing an internal chamber of the enclosure in fluid communication with the liquid bath, such that the submerged lower part of the enclosure contains a volume of the liquid bath, the enclosure includes at least one opening for discharging a gas stream positioned above the surface of the volume of liquid contained in the submerged lower part of the enclosure, the device further including means for producing and injecting a gas stream including at least one injection conduit, of which a lower part is submerged in the volume of liquid contained in the submerged lower part of the enclosure, the at least one injection conduit extends in the upper part inside the enclosure above said volume of liquid contained in the submerged lower part of the enclosure, the submersion depth of the injection conduit being between 20 mm and 200 mm, and said injection conduit including, in said submerged lower part of the injection conduit, at least one discharge opening positioned below the surface of said volume of liquid contained in the submerged lower part of the enclosure, said means for producing and injecting a gas stream include a compressor connected to the discharge opening of the enclosure, and said compressor, during operation, creates and introduces an incoming gas stream, coming from outside the enclosure, in the non-submerged part of the injection conduit, with a flow rate of at least 100 $m^3/h$, and such that said incoming gas stream passes through the discharge opening of the submerged lower part of the injection conduit, and is introduced into said volume of liquid contained in the submerged lower part of the enclosure, below the surface of said volume of liquid, and such that an outgoing gas stream, treated by direct contact with said volume of liquid, rises inside the enclosure outside the injection conduit and is discharged outside said enclosure, passing through the discharge opening of the enclosure;
    wherein for recovering calories in an incoming gas stream, and including an energy recovery system to recover at least part of the calories captured in the liquid from the bath of said device; and
    wherein the energy recovery system includes a closed circuit in which a heat transfer fluid circulates, and which comprises an evaporator allowing a heat exchange with the liquid in the bath.

4. The device according to claim 1, wherein the bath of liquid is open at the upper part, and more particularly includes an open tub at the upper part.

5. The device according to claim 1, wherein the injection conduit introduces the gas stream into said volume of liquid by steering the gas stream downward.

6. The device according to claim 1, wherein the enclosure includes one or several baffles, which circulates the gas stream leaving the volume of liquid up to the discharge opening, by having the gas stream undergo one or several changes of direction, so as to prevent liquid from being sprayed through the discharge opening.

7. The device according to claim 1, wherein the temperature of the liquid is lower than the temperature of the gas stream entering the enclosure.

8. The device according to claim 7, for recovering calories in an incoming gas stream, and including an energy recovery system to recover at least part of the calories captured in the liquid from the bath of said device.

9. The device according to claim 1, further comprising a duplicate device according to claim 1 for recovering calories in a gas stream which are mounted in a cascade, such that the gas stream leaving the device is used as an incoming gas stream of the duplicate device.

10. The device according to claim 1, wherein the temperature of the liquid is higher than the temperature of the incoming gas stream entering the enclosure.

11. The device according to claim 3, wherein said means for producing and injecting a gas stream, during operation, creates and introduces said incoming gas stream, coming from outside the enclosure, in the non-submerged part of the injection conduit, without modifying the outside pressure above the liquid of the bath outside the enclosure.

12. The device according to claim 3, wherein the bath of liquid is open at the upper part, and more particularly includes an open tub at the upper part.

13. The device according to claim 3, wherein the injection conduit introduces the gas stream into said volume of liquid by steering the gas stream downward.

14. The device according to claim 3, wherein the enclosure includes one or several baffles, which circulates the gas stream leaving the volume of liquid up to the discharge opening, by having the gas stream undergo one or several changes of direction, so as to prevent liquid from being sprayed through the discharge opening.

15. The device according to claim 3, wherein the temperature of the liquid is lower than the temperature of the gas stream entering the enclosure.

16. The device according to claim 3, further comprising a duplicate device according to claim 3 for recovering calories in a gas stream and which are mounted in a cascade, such that the gas stream leaving the device is used as an incoming gas stream of the duplicate device.

17. A method of gas stream modification comprising operating a device according to claim 1 comprising:
   introducing from an input volume and into the enclosure as the incoming gas stream air or a gas containing at least one of particles or pollutants; and
   exhausting from the enclosure a modified gas stream into a space, the modified gas stream varying as at least one of temperature, humidity, content of particles, or content of pollutants, the space being the input volume, an exhaust site, or a combination thereof.

18. The method according to claim 17, wherein the gas containing at least one of particles or pollutants is present and the content of particle, the content of pollutants, or combination thereof are captured in the liquid of the bath of the device.

19. The method according to claim 17, wherein the incoming gas flow stream contains industrial fumes, and in particular high-temperature industrial fumes.

20. The method according to claim 17, wherein the liquid bath, outside the enclosure, is at atmospheric pressure, including during the operation of the means for producing and injecting the incoming gas stream and wherein the discharge opening of the injection conduit is positioned at the same level as the liquid intake opening of the submerged lower part of the enclosure or above the level of the liquid intake opening of the submerged lower part of the enclosure and wherein at least part of the calories captured in the liquid bath are used for heating.

* * * * *